Figure 1:
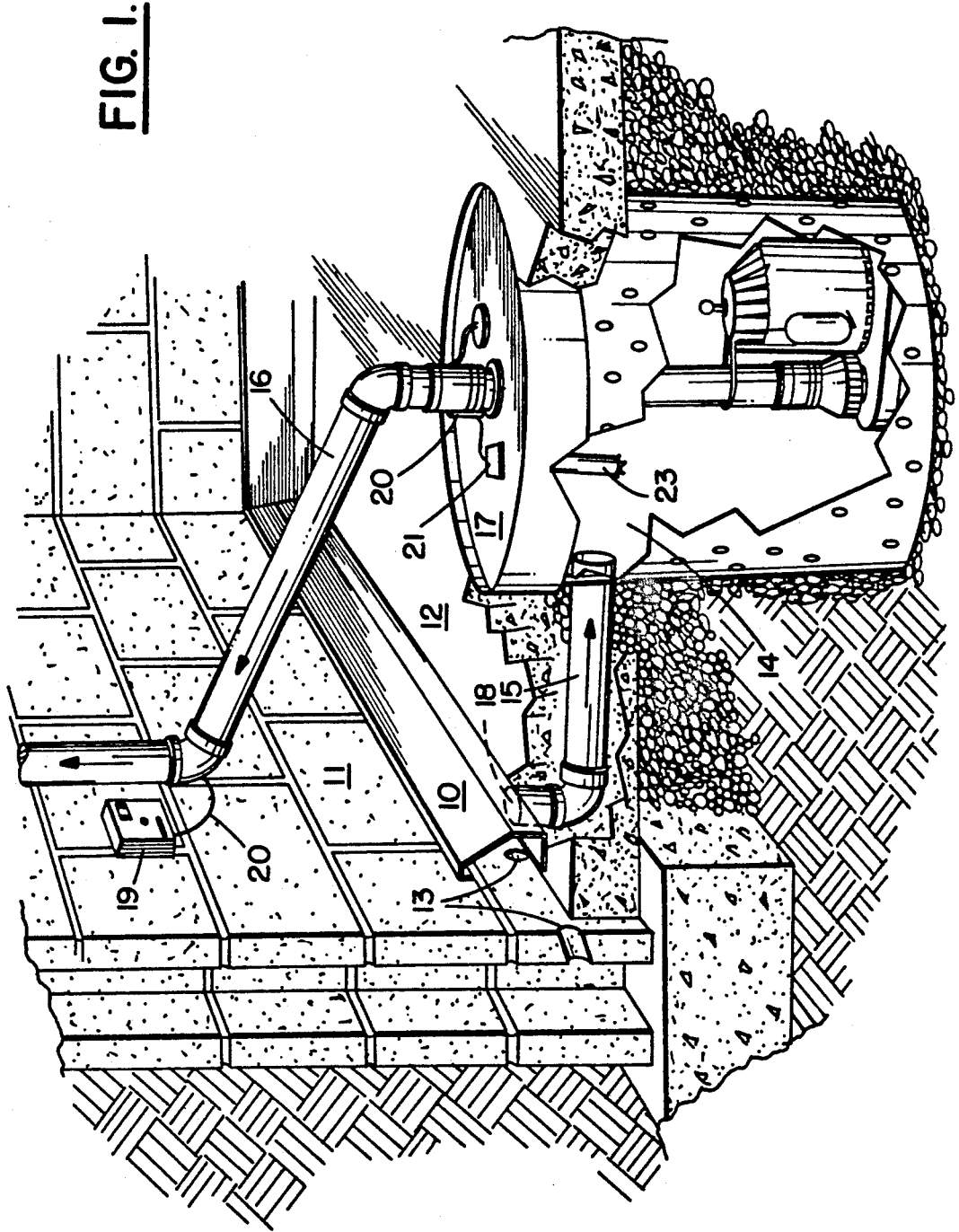

United States Patent [19]
Janesky

[11] Patent Number: 5,314,313
[45] Date of Patent: May 24, 1994

[54] WATER-SENSING ALARM FOR WATER-CONTROL SYSTEMS

[76] Inventor: Lawrence Janesky, 1 Clayton St., Milford, Conn. 06460

[21] Appl. No.: 81,525

[22] Filed: Jun. 23, 1993

[51] Int. Cl.$^5$ .............................................. G08B 21/00
[52] U.S. Cl. ........................................ 417/63; 340/620
[58] Field of Search .................... 417/63; 137/558; 340/620

[56] References Cited

U.S. PATENT DOCUMENTS

| | | | |
|---|---|---|---|
| 3,399,399 | 8/1968 | Apfelbaum | 340/620 X |
| 3,540,027 | 11/1970 | Rauth et al. | 340/620 |
| 3,644,916 | 2/1972 | Payne | 417/63 |
| 4,228,427 | 10/1980 | Niedermeyer | 417/63 X |

Primary Examiner—Richard E. Gluck
Attorney, Agent, or Firm—Perman & Green

[57] ABSTRACT

An alarm system for sounding an audible warning whenever the water level within a sump pump enclosure exceeds the level which normally actuates the sump pump. The alarm system comprises an open electrical circuit including a battery, a battery-powered audible warning device and an elongate probe having closely-spaced contact members adjacent the tip thereof. The tip is suspended in the pump enclosure, above the pump-actuation level, and the warning device is activated whenever the water level rises above the pump-actuation level and immerses the contact members.

3 Claims, 2 Drawing Sheets

WATER-SENSING ALARM FOR WATER-CONTROL SYSTEMS

BACKGROUND OF THE INVENTION

Field of the Invention

The present invention relates to fail-safe water-control systems for admitting, channeling, collecting and expelling ground water from basements or other subterranean rooms having walls and a floor. The problems caused by the invasion of ground water into basements and other structures are numerous. Generally such water seeps into basements at various peripheral locations between floor-wall joints, due to external hydrostatic pressures of water accumulations, which pressures can produce cracks in cement walls and/or floors. The admitted water is channeled to an enclosed sump pump which is activated when the water level rises to an activation level to pump the water to an exterior location.

State of the Art

According to a conventional water control system, a plurality of spaced bore holes are drilled along the area of the floor-wall joint around the inner periphery of a basement or other subterranean room, outwardly and downwardly, to admit any exterior groundwater accumulation as it occurs and prevent the build-up of hydrostatic pressure. Then a continuous, plastic, water-channelling enclosure is bonded to the surface of the floor, adjacent the floor-wall joint around the inner periphery of the room, to control the admitted ground water and channel and drain it into a collection location, such as a sump pump reservoir, from which it is pumped automatically through a discharge conduit to an exterior drain. Alternatively, a trench is developed around the perimeter of the floor and a perforated pipe is installed, surrounded by crushed stone and the floor is recemented. The pipe collects water and channels it to the sump pump reservoir, where it is pumped out of the basement.

Such water-control systems produce excellent results but their effectiveness is dependent upon the operation of the sump pump and/or the ability of the discharge conduit to convey the pumped water therefrom to the exterior location. If the pump fails, is accidentally unplugged, the circuit breaker is tripped, or if the discharge conduit freezes or becomes plugged, the water level can rise in the pump enclosure and leak into the basement before the occupant becomes aware of the problem. Thus, the intentionally-admitted ground water will present greater problems than if the system was not installed in the first place.

SUMMARY OF THE INVENTION

The present invention relates to a novel high-water level sensing audible alarm and an assembly thereof with a conventional basement water-control system designed to provide an audible warning whenever the automatic water discharge system fails to operate. Thus, the present assembly produces substantial improvements over conventional water-channeling systems by providing an audible warning if the system becomes inoperative before any water seeps into the basement.

The present water level-sensing audible alarm component comprises a probe or sensor component designed to be inserted down into a hole in the lid of a sump reservoir to extend a predetermined distance thereinto, short of the normal pump-activation water level in the reservoir and generally proximate said water level. The leading edge of the sensor or probe comprises two spaced leads, each connected to an electrical circuit comprising a buzzer, bell or other audible warning device which is activated whenever the water level in the sump pump compartment rises above the normal pump-activation water level to contact the spaced leads, complete the circuit and activate the warning device. Thus, whenever the pump fails to activate automatically, or whenever the activated pump is unable to pump water from the pump compartment out through the discharge conduit, the water level continues to rise in the pump compartment beyond the normal pump activation level, reaches the leading edge of the probe or sensor and produces an electrically-conductive water path between the two spaced leads. This completes the electrical circuit and causes the battery to energize the audible alarm to warn the owner that the water-control system is inoperative for one reason or another, such as a blown fuse or circuit breaker in the house current which normally powers the electrical sump pump, or a defective sump pump, or a blocked discharge conduit.

THE DRAWINGS

Figure 2:
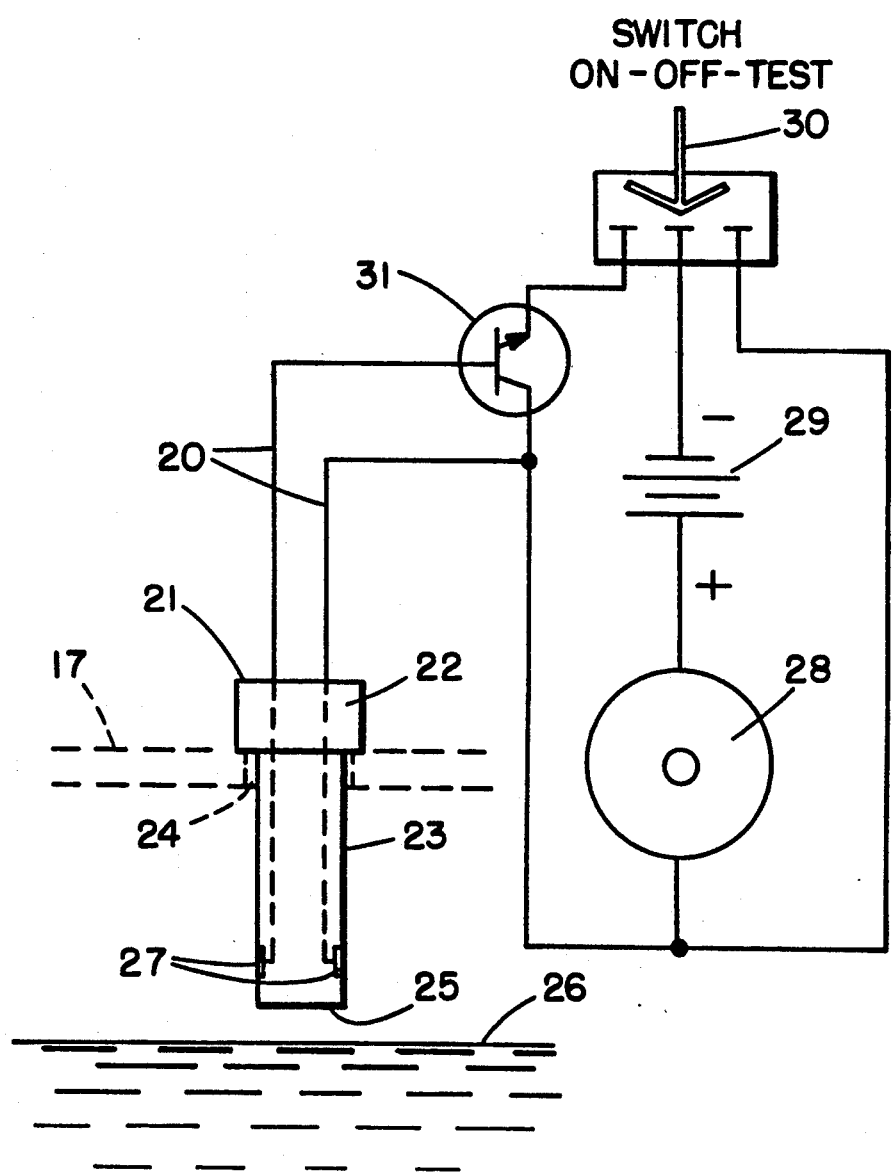

FIG. 1 is a schematic illustration of a basement water control system incorporating a water-sensing alarm according to the present invention; and FIG. 2 illustrates the circuitry and components for a battery-operated water-level sensing alarm device according to the present invention.

DETAILED DISCUSSION

Referring to FIG. 1, the water control system thereof comprises a plastic water-channelling gutter enclosure 10 installed adjacent the joint of the wall 11 and the floor 12 around the periphery of a basement or other subterranean room. Prior to installation of the enclosure 10, a plurality of evenly-spaced bore holes 13 are drilled downwardly and outwardly through the wall 11, adjacent the joint with the floor 12 to admit groundwater through the wall and prevent the built-up of hydrostatic pressure. Also, a sump pump enclosure or reservoir 14 and an enclosure drain conduit 15 are installed beneath the floor 12, the sump pump having a discharge conduit 16 which opens to a suitable exterior drain location. The water-channeling enclosure 10 is bonded to the floor 12, and the base thereof is provided with a drain opening 18, shown by means of broken lines, in the area overlying the drain conduit 15, to permit the groundwater admitted into the peripheral enclosure 10 to be channeled to the location of the drain opening 18 and to flow therefrom to the pump reservoir 14 from which it is pumped through conduit 16 whenever the water accumulation reaches a pump-activation level provided that the system is operative.

The assembly of FIG. 1 further comprises an audible water sensor alarm component comprising a remote wall-mounted alarm and battery enclosure 19 connected by insulated wires 20 to an elongate probe or sensor 21, shown in FIG. 2. The probe 21 comprises a housing having an upper stop member 22 and an elongate rigid lower tubular extension 23 of predetermined length, such as about 4 inches, and is designed to be inserted through an opening 24 in the cover 17 of the sump pump enclosure 14 and to extend down into the pump reservoir or enclosure 14. The diameter of the opening 24 is slightly larger than that of the probe extension 23 but smaller than that of the stop member 22, whereby the probe 21 is supported with its leading edge or tip 25 a predetermined distance above the normal maximum water level 26 within the pump compartment. Level 26 is the normal pump-activation water level when the system is operating as intended.

The alarm wires 20 are exposed at, or connected to spaced contacts 27, adjacent the leading edge or tip 25 of the probe extension 23, whereby if the water level rises above pump-activation level 26 and reaches the contacts 27, current is enabled to flow from one contact 27 to the other contact 27 to complete the alarm circuit and cause the audible alarm component 28 to be energized by the battery 29 to warn the occupant that the water control system is inoperative.

The alarm system illustrated by FIG. 2 further comprises an on-off-test switch 30 and a transistor 31 which by-passes the probe to enable the battery to be tested when the switch is activated to the test-mode from the normal on-mode.

The present alarm system is battery-powered, so as to operate independently of house current, and the alarm module may be located at any remote location of the building at which the activated alarm is most likely to be heard at the earliest possible time.

The length of the probe extension 23 down into the pump housing 14 will depend upon the depth of the housing and the distance between the desired alarm-activation water level and the cover 17. Adjustments may be made by using an adjustable - position stop member 22, or by inserting shim rings beneath the stop member 22 to raise the leading edge 25 of the sensor end of the probe 21 to a desired alarm-activation position.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In a water control system for admitting exterior ground water into a subterranean room, channeling it into a sump pump reservoir having a cover and containing a water level-actuated sump pump, and automatically pumping the water therefrom whenever the water level rises to the pump-activation level, the improvement which comprises an alarm which is activated whenever the water level in the sump pump reservoir rises above the pump-actuation level, said alarm comprising an open electrical circuit including a power source, an audible warning means and an elongate, removable probe member comprising an elongate housing having an upper stop member and a lower contact end containing exposed spaced contacts which, when immersed in water, close said circuit to activate said audible warning means, said probe member housing extending through an opening in said reservoir cover and being supported by engagement between said probe stop member and the upper surface of said cover, the contact end of said probe member being contained within the sump pump reservoir, supported at a predetermined alarm activation level, above said sump pump actuation-level, to provide an audible warning whenever the water level rises to said alarm-activation level.

2. A water control system according to claim 1, in which said alarm comprises an open electrical circuit including a battery, and said audible warning means is battery-powered.

3. A water control system according to claim 1 in which said stop member of said elongate probe member is adjustable, relative to said sump pump cover, to adjust said alarm activation level.

* * * * *